(12) United States Patent
Gottwald

(10) Patent No.: US 7,024,117 B1
(45) Date of Patent: Apr. 4, 2006

(54) METHOD AND APPARATUS FOR ADJUSTING TILTING AND LEVEL OF OPTICAL SIGNALS

(75) Inventor: Erich Gottwald, Holzkirchen (DE)

(73) Assignee: Siémens Aktiengesellschaft, Munich (DE)

( * ) Notice: Subject to any disclaimer, the term of this patent is extended or adjusted under 35 U.S.C. 154(b) by 0 days.

(21) Appl. No.: 09/555,295

(22) PCT Filed: Nov. 6, 1998

(86) PCT No.: PCT/DE98/03254

§ 371 (c)(1),
(2), (4) Date: May 26, 2000

(87) PCT Pub. No.: WO99/29057

PCT Pub. Date: Jun. 10, 1999

(30) Foreign Application Priority Data

Nov. 28, 1997 (DE) ................. 197 52 982
Nov. 28, 1997 (DE) ................. 197 52 983

(51) Int. Cl.
*H04J 14/02* (2006.01)
*H04B 10/12* (2006.01)

(52) U.S. Cl. .................... 398/92; 359/341.42
(58) Field of Classification Search ........... 359/345, 359/349, 337, 160, 177, 134, 341, 333, 334, 359/341.42; 398/94, 37, 92
See application file for complete search history.

(56) References Cited

U.S. PATENT DOCUMENTS 5,173,957 A * 12/1992 Bergano et al. ........... 385/24
5,745,283 A * 4/1998 Inagaki et al. ........ 359/337.13

(Continued)

FOREIGN PATENT DOCUMENTS

| | | |
|---|---|---|
| DE | EP 0 734 105 | 9/1996 |
| EP | 0 139 081 | 5/1985 |
| GB | 2 294 170 | 4/1996 |
| JP | 57-176312 | 10/1982 |
| JP | 58-85588 | 5/1983 |
| JP | 59-65828 | 4/1984 |

OTHER PUBLICATIONS

Paul F. Wysocki et al., Broad-Band Erbium-Doped Fiber Amplifier Flattened Beyond 40 nm Using Long-Period Grating Filter, IEEE Photonics Technology Letters, vol. 9, No. 10, Oct. 1997, pp. 1343-1345.

(Continued)

*Primary Examiner*—M. R. Sedighian
*Assistant Examiner*—Shi K. Li
(74) *Attorney, Agent, or Firm*—Bell, Boyd & Lloyd LLC

(57) ABSTRACT

Pump energy with a wavelength which is below the wavelength of an optical signal is fed into a transmission section from a pump laser via a coupler. The received optical signal is attenuated with increasing pump power with signals having higher frequencies being more strongly damped.

25 Claims, 3 Drawing Sheets

U.S. PATENT DOCUMENTS

| | | | | |
|---|---|---|---|---|
| 5,764,404 | A | * | 6/1998 | Yamane et al. ........ 359/337.12 |
| 5,991,070 | A | * | 11/1999 | Zanoni et al. ......... 359/341.33 |
| 6,055,093 | A | * | 4/2000 | Chikuma et al. ........... 359/337 |
| 6,067,187 | A | * | 5/2000 | Onaka et al. .......... 359/337.11 |
| 6,081,366 | A | * | 6/2000 | Kidorf et al. .......... 359/341.32 |

OTHER PUBLICATIONS

Hans-Georg Unger, et al., "Optische Nachrichtentechnik", Teil II: Komponenten, Systeme, Meβtechnik, (1992), pp. 329-330.

Encyclopedia of Applied Physics, vol. 1, Edited by George L. Trigg, pp. 607-621.

Reinhold Ludwig, "Optische Halbleiterlaser-Verstärker in zukünftigen LWL-Übertragungssystemen", ntz bd. 43, (1990) Heft 1, pp. 8-13.

B. Clesca, et al., Gain Flatness Comparison Between Erbium-Doped Fluoride and Silica Fiber Amplifiers With Wavelength-Multiplexed Signals, IEEE Photonics Technologie Letters, vol. 6, No. 4, (1994) pp. 509-512.

\* cited by examiner

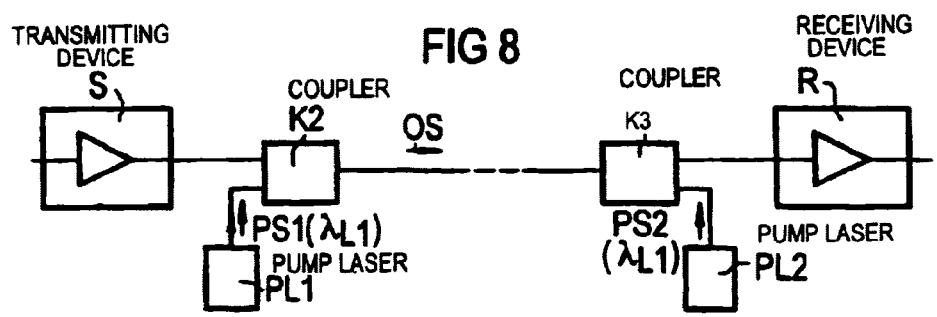
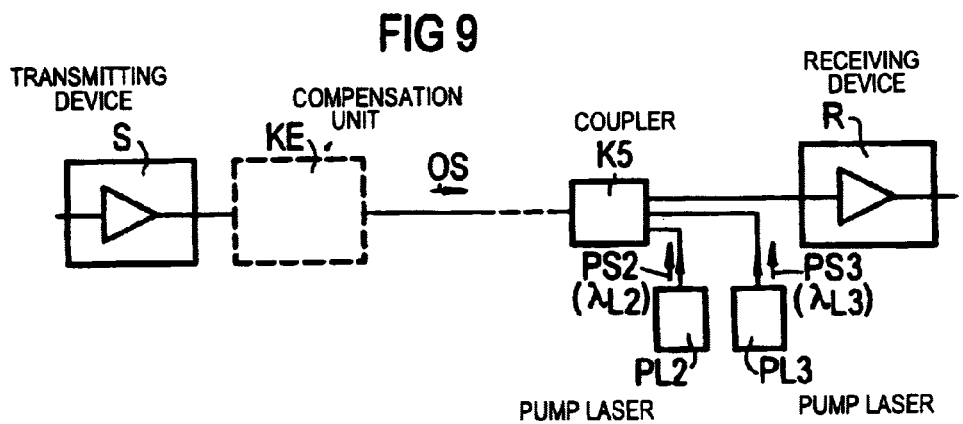
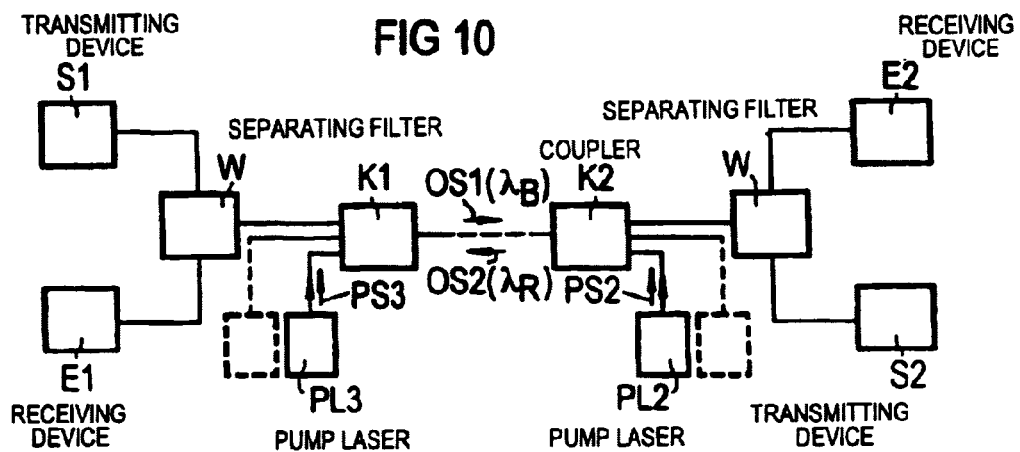

METHOD AND APPARATUS FOR ADJUSTING TILTING AND LEVEL OF OPTICAL SIGNALS

BACKGROUND OF THE INVENTION

Optical signals are transmitted via optical conductors. They are frequently amplified by using fiber amplifiers. These use either specially doped lengths of fiber, or utilize nonlinear effects on normal transmission fibers, as in the case of the Raman fiber amplifier described in ntz, volume 43, (1990), issue 1, pages 8 to 13.

In the case of many transmission devices, use is also made of attenuators with the aid of which required level values (e.g., the input levels of amplifiers) are adjusted, as is described, for example, in IEEE PHOTONICS TECHNOLOGY LETTERS, Vol. 6, No. 4, April 1994, pages 509 to 512.

Modern transmission systems use a plurality of signals with the aid of the wavelength division multiplex method, (WDM), in which a plurality of transmission channels are combined in each case to form a transmission band that is amplified in common. The Raman effect produces an influence between the transmission bands where the levels of the individual signals (channels) are affected differently, which is denoted as tilting and to date has mostly been compensated by nonlinear amplifiers and filters. The fundamentals of the stimulated Raman scattering are described in Nonlinear Fiber Optics, Second Edition, Govind P. Agrawal, Academic Press, Chapter 8.

European Patent Application EP 0 139 081 A2 describes an optical communication system in which the transmitted optical signal is amplified on the basis of the stimulated Raman effect by a plurality of pump signals of different wavelengths. The different pump signals are selected such that the gain characteristic and the signal levels run as ideally as possible.

European Patent Application EP 0 734 105 A2 discloses a fiber amplifier which is used by means of a pump signal and a mirror for the purpose of compensating the dispersion. FIG. 47 shows the tilting of the signal levels (slope gain) as a function of the pump power.

GB 2 294 170 A describes an arrangement for amplifying which monitors the number of active channels and also keeps the level at a preselected value in the event of absence of individual channels.

Patent Abstracts of Japan publication number 59065828/ application number 57176312 describes an amplifier for a continuous optical signal (constant wave). The light from a signal source 11 of shorter waves is converted to the wavelength of the auxiliary light source of longest waves with the aid of the auxiliary light sources 13 to 20, tuned to the Stokes wavelength, on the basis of the stimulated Raman effect.

None of these references provides satisfactory adjustment or compensation of the tilting, in particular in the case of WDM systems with a plurality of transmission bands.

Particularly in the case of WDM systems in which a plurality of groups of signals are transmitted, the stimulated Raman scattering, (SRS), is to amplify the signals transmitted in "longwave" channels at the expense of the signals transmitted in "shortwave" channels. In other words, energy is extracted from the shortwave "blue" channels, which are more strongly damped with decreasing wavelength (increasing frequency), while this benefits the longer wave "red" channels. The larger the wavelength, the more the corresponding transmission channels profit. A similar statement holds for the spectral components of signals with high bit rates.

The influence of the SRS effect is illustrated in FIGS. 1 and 2. The left-hand diagram of FIG. 1 shows a constant reception level, independent of wavelength, of the blue transmission band (wavelength region) $\lambda_B$. The right-hand diagram illustrates the reception level when simultaneous use is made of a further "red" wavelength region for optical signal transmission. The smaller the wavelength of the blue transmission band, the stronger the attenuation.

The level relationships for the "red" transmission band $\lambda_R$ are illustrated in FIG. 2. The left-hand diagram in FIG. 2 shows the linear level characteristic for a case where signals are transmitted only in this transmission band. If, in addition, there is transmission in the "blue" wavelength region, the level is raised higher with increasing wavelength. This depends only slightly on whether the signals in the transmission bands are transmitted in the same or opposite directions (co-propagating waves - counter-propagating waves). The change in the levels, illustrated in the right-hand diagrams of FIGS. 1 and 2, as a function of the wavelength, which corresponds to a pivoting about a common fulcrum, is denoted as tilting.

In today's typical transmission with two times eight channels, the effect described gives rise to additional attenuations or amplifications in a transmission section (approximately 40–80 km) of between 0.4 to 0.7 dB. In the case of transmission links with up to 10 or more transmission sections and a corresponding number of repeaters, these changes in level add up correspondingly. If one of the transmission bands is absent, there is also a very quick change in the level of the signal in the intact transmission band. The automatic gain control at the receiving end can usually not compensate these level fluctuations quickly enough, the result being error bursts in the millisecond region. A quick restitution of the previous level is required in this case.

For many applications, it is possible for the level and the tilting of signal bands to be adjusted frequently independently of one another.

SUMMARY OF THE INVENTION

It is therefore an object of the invention to specify a method and an arrangement for adjusting the tilting for broadband optical signals. The method is also intended to be used for simultaneous level adjustment.

A further object consists in designing the method for rapid stabilization of the tilting and of the signal level of an intact transmission band in the event of absence of another transmission band and to specify a suitable arrangement.

According to an aspect of the present invention, a method for adjusting tilting of a broadband optical signal transmitted via an optical conductor through injecting pump signals into the optical conductor includes first injecting of first pump signal into the optical conductor. The first pump signal has a wavelength less than a minimum wavelength of the optical signal. Next, a second pump signal is injected into the optical conductor having a second wavelength greater than a maximum wavelength of the optical signal and a wavelength spacing relative to a mean wavelength of the optical signal that is different from the first pump signal. Finally, wavelength and levels of the first and second pump signals are selected such that the optical signal has a predetermined tilting.

According to another aspect of the present invention, a method for adjusting tilting of an optical signal transmitted via an optical conductor through injecting a plurality of pump signals into the optical conductor includes transmitting a plurality of transmission bands via the optical conductor. Signal levels of each of the plurality of transmission bands are measured and at least one pump signal is injected from the plurality of pump signals into the optical conductor when a prescribed condition and a signal level of at least one of the measured signal levels of the plurality of transmission bands occurs. Also, a level of the at least one pump signal is selected such that the tilting of the transmission band in which the prescribed condition does not occur remains at least substantially constant at a receiving end of the optical conductor.

According to yet a further aspect of the present invention, an apparatus is provided for adjusting tilting and level of an optical signal including at least two pump lasers that inject respective pump signals into the optical conductor including a first pump laser configured to inject a first pump signal having a first wavelength that is less than a minimum wavelength of the optical conductor and a second pump laser configured to inject a second pump signal having a second wavelength that is greater than a maximum wavelength of the optical conductor. Also, the second pump laser is configured to inject the second pump signal having a wavelength spacing relative to a mean wavelength of the optical signal that is different from the first pump signal. The wavelength and levels of the first and second pump signals are selected such that the optical signal has a prescribed tilting and a prescribed level.

According to another aspect of the present invention, an apparatus for adjusting tilting and level of an optical signal transmission via an optical conductor includes at least two pump lasers that inject respective pump signals into the optical conductor. Also, a controller is provided to measure signal levels of at least two transmission bands and adjust a power level of at least one of the respective pump signals when a prescribed condition occurs such that the tilting of a transmission band in which the prescribed condition does not occur remains at least substantially constant at a receiving portion of the optical conductor.

An advantage of the method according to the invention is that the tilting and the signal level can be adjusted largely independently of one another in conjunction with the use of two pump signals. The signal (e.g., a wavelength multiplex signal) can be both amplified and attenuated by the method. Moreover, the tilting can be changed in relatively wide ranges, thus producing a desired equalization of the signal. Pump lasers feed in pump signals with wavelengths above and below the transmission band. These pump signals either extract energy from the signal or lead energy to it. Consequently, the signal is amplified or damped by varying the pump energy, with tilting simultaneously occurring.

The suitable selection of the pump laser wavelengths can be used to control gain/attenuation and tilting in wide ranges. The required tilting can also already be achieved by means of a suitable pump signal of greater wavelength.

It is advantageous if the pump energy is fed in at the receiving end, since this leads to a more favorable signal-to-noise ratio. The tilting is independent of the spacing of the wavelength of the pump laser from the (mean) wavelength of the signal. The arrangement can preferably also be carried out only as an attenuator. The degree of tilting can be determined as a function of the attenuation by the selection of the pump wavelength. Such an "optical attenuator" can also be used to control the level of the optical signal at the receiving end. In a particularly simple attenuator tailored to the respective application, only one laser is used, the result being to produce a desired functional relationship between attenuation and tilting.

In the absence of one transmission band, the level remains virtually constant in the undisturbed transmission band whenever the pump laser is used either as an energy supplier or as an energy absorber which compensates for the action of the absent transmission band. Since the change in power of the pump laser that is required to compensate the absent transmission band is known, its absent corresponding power is very quickly changed so that as few transmission errors as possible occur. An exact readjustment is not required in general, but can additionally provided.

In general, a more favorable signal-to-noise ratio results when the pump laser is used at the receiving end. Here, the controller can also intervene in the receiving amplifier, if appropriate, in order to achieve an optimum level characteristic by controlling its transmission response.

In order to simultaneously use the level to compensate the tilting of the undisturbed transmission band, it is advantageous if the frequency of a pump laser which has been turned off in the case of undisturbed operation corresponds approximately to the center frequency of the absent transmission band.

For the purpose of optimum compensation of the absent transmission band, it is advantageous to use a plurality of pump lasers having different wavelengths below and above the transmission bands. Optimum compensation is already possible with two pump signals of different wavelengths. It is also favorable, though often not possible to realize, to use a pump laser whose frequency is between the two wavelength regions, since the transmission bands are then treated equally with preference to damping and gain.

Additional advantages and novel features of the invention will be set forth, in part, in the description that follows and, in part, will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent similar elements throughout and wherein:

FIG. 8 shows a transmission section with a pump laser inserted at the transmitting end and a pump laser inserted at the receiving end;

FIG. 9 shows a transmission section with two pump lasers inserted at the receiving end, in a preferred embodiment; and FIG. 10 shows two pump lasers, inserted at the receiving end, for bidirectional operation.

DESCRIPTION OF THE PREFERRED EMBODIMENTS

Figure 3:
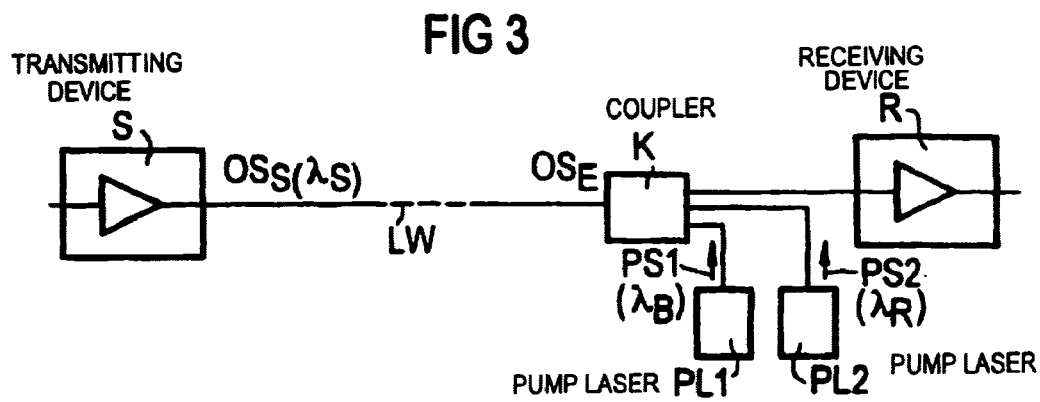
FIG. 3 shows a block diagram of the level adjustment of an optical signal.

FIG. 3 shows a transmission section with a transmitting device S (e.g., a laser or an amplifier) that feeds an optical signal $OS_S$ with the relatively large wavelength region $\lambda_S$ into an optical conductor LW, and a receiving device R, which likewise has an amplifier. The optical signal can, for example be a digital multiplex signal with a relatively large bandwidth, or a wavelength multiplex signal. The optical signal (received signal) $OS_E$ damped by the transmission link is fed to the receiving device R.

Figure 1:
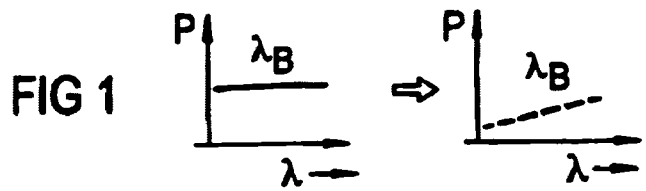
FIG. 1 graphically illustrates the effects of stimulated Ramon scattering for a blue transmission band.
Figure 2:
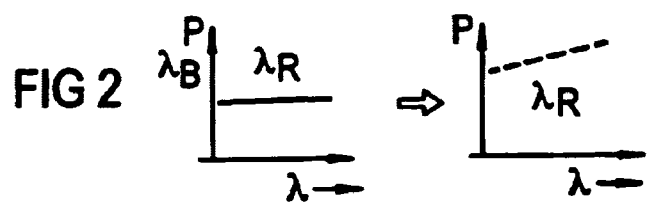
FIG. 2 graphically illustrates the effect of stimulated Ramon scattering for a red transmission band.

Arranged at the receiving end are two pump lasers PL1 and PL2 that feed into the optical conductor LW via a coupler K a pump signal PS1 having a wavelength $\lambda_B$ that is below the smallest wavelength $\lambda_{MI}$ of the optical signal and a pump signal PS2 with a wavelength $\lambda_R$ which is above the largest wavelength $\lambda_{MA}$ of the optical signal see e.g., (FIG. 2). The pump signal PS2 attenuates the optical signal $OS_E$. The higher the power of the pump signal, the weaker the optical signal becomes. This attenuation increases with the difference in the wavelength of the optical signal from the wavelength of the pump laser. The pump signal PS1 increases the signal level again, but the tilting takes place in the same direction of rotation. However, since the spacing from the frequency band $\lambda_S$ or its mean or smallest wavelength $\lambda_{MI}$ is not equal to the spacing of the wavelength $\lambda_R$ of the second pump signal, a different relationship results between the gain and tilting. Thus, different tiltings can be implemented for adjustable attenuation values or gain values.

If an "attenuator" dependent on wavelength is to be implemented, the action of the pump laser with a "red" wavelength (greater than the maximum wavelength $\lambda_{MA}$) must predominate. If, by contrast, an amplifier is to be implemented, the action of the "blue" pump laser with a "blue" wavelength (smaller than the minimum wavelength $\lambda_{MI}$) must predominate.

In a simplified embodiment of an "attenuator", in the case of which, however, it is no longer possible for the tilting and level to be adjusted independently, only a "red" pump laser is used.

Moreover, amplifiers can also be implemented which have at least two "blue" pump lasers and permit different tiltings in conjunction with the same gains. Likewise, attenuators can be implemented which have at least two "red" pump lasers and which permit different tiltings in conjunction with the same attenuation values.

Figure 4:
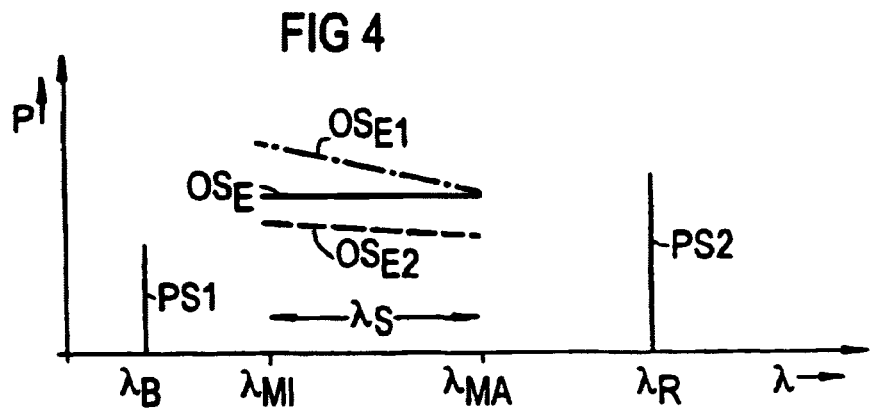
FIG. 4 shows the level characteristic of an optical signal as a function of two pump signals.

The action of two pump lasers is shown in FIG. 4. The upper level characteristic drawn with a broken line (P—level, λ—wavelength) of the optical received signal $OS_{E1}$ initially has a relatively large level at small wavelengths, and a small level at large wavelengths. This characteristic, which overcompensates the Raman effect active on the transmission link is achieved by means of filters or amplifiers at the transmitting end or receiving end.

However, as soon as the pump laser PL2 is switched on, the received signal $OS_{E2}$ is attenuated, the shorter wave (higher frequency) signals being more strongly attenuated. Once the pump laser PL1 becomes active, the level is raised again, the tilting of the received signal $OS_E$ is, however, amplified once more, and a linear level characteristic is achieved.

Since the spacings of the wavelengths of the pump lasers relative to the received signal are different, the tilting and level can be adjusted independently of one another in specific regions. If the wavelengths of the two pump lasers are greater than the maximum wavelength of the received signal, the attenuation can be adjusted in a larger region and independently of the tilting. Similarly, this principle also applies to blue pump laser in a corresponding manner.

Figure 5:
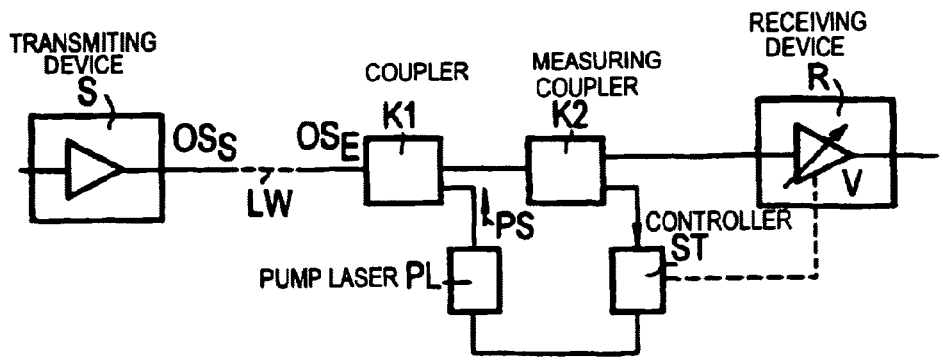
FIG. 5 shows a device for level control.

FIG. 5 shows a pump laser PL as part of a control circuit arranged at the receiving end according to another embodiment. A part of the optical received signal $OS_E$ is outcoupled as measuring signal via a measuring coupler K2 and fed to a controller ST which keeps the amplitude of the optical received signal constant by controlling the pump laser, which feeds its pump signal into the optical conductor via a coupler K1 (here, a coupler is understood to be any device that permits a signal to be fed in). The controller ST can additionally intervene in the receiving device R and control the pump laser and the gain or gain tilting in accordance with a prescribed scheme. Instead of a controller, it is also possible to use a control circuit or the combination of an open-loop controller and a closed-loop controller.

Figure 6:
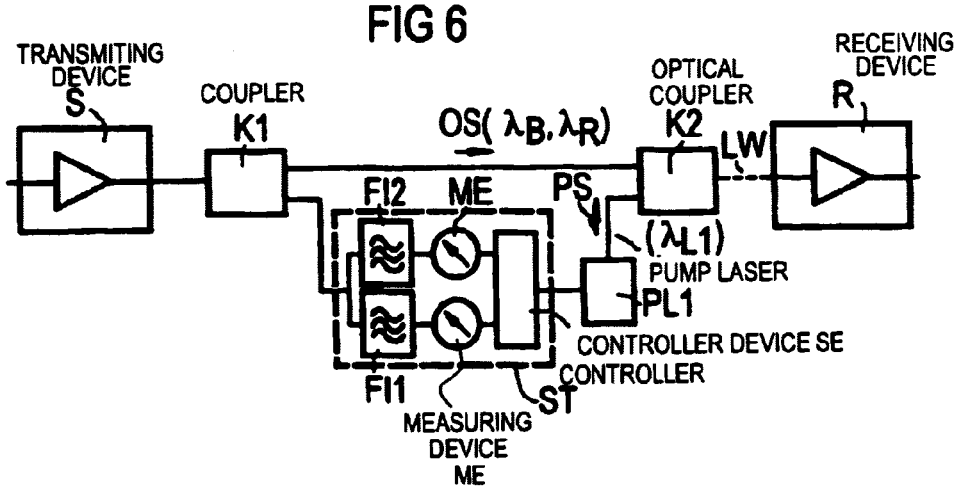
FIG. 6 shows a transmission section provided with a pump laser.

FIG. 6 shows a link section with transmitting device S (e.g., an amplifier at the transmitting end which feeds an optical signal OS into an optical conductor LW), an optical conductor LW and a receiving device R. The optical signal comprises, for example, two times eight channels which are emitted in a blue transmission band $\lambda_B$ (1535 to 1547 nm) and a red transmission band $\lambda_R$ (1550 to 1562 nm). A first pump laser PL1 is provided at the transmitting end (or also at the start of any desired link section between the illustrated amplifiers) that sends into the fiber of the optical conductor LW a pump signal PS of constant wavelength $\lambda_{L1}$ via an optical coupler K2 (a coupler is always understood as any device which permits a signal to be fed in). This can be both a longwave "red" pump laser whose wavelength is above the wavelength of the "red" transmission band at approximately 1600 (up to approximately 1630 nm), and a shortwave "blue" pump laser with a wavelength at 1480 nm (up to approximately 1440 nm).

The pump lasers can be used (together with suitable filters or amplifiers) both in undisturbed operation for the purpose of compensating the Raman effect or other nonlinearities, and in the event of absence of a transmission band for the purpose of compensating the change in level caused by the Raman effect.

Assuming that the pump laser is active during undisturbed operation, its power is (as a rule), lower than the signal power. If a longwave pump laser is used and if the red band is absent, the pump power must be increased in order to extract more energy from the blue transmission band. If, by contrast, the blue band is absent, the power of the pump laser must be lowered so that less energy is extracted from the "red" transmission band.

The relationships are exactly reversed in the case of a shortwave "blue" pump laser. If the red band is absent, the power must be lowered, since less energy has already been extracted from the blue transmission band. If, by contrast, the blue transmission band is absent, the power of the pump laser must be increased in order, as before, to supply the same energy to the red transmission band.

In order to establish the absence of the transmission band, or else individual channels, a suitable controller ST must first separately measure the signal levels of both transmission bands. For this purpose, the transmitted signals are fed to measuring devices ME via a measuring coupler K1 and suitable optical filters FI1, FI2. The values of the measured signal levels, for example the aggregate level, are fed to a control device SE which readjusts the power of the pump oscillator in accordance with the change.

The pump laser, which only couples in pump power in the event of a disturbance, can also operate at the mean frequency of the absent transmission band in order to render optimum compensation possible.

Given the use of a suitable measuring device, the pump laser can also be used to correct the level and tilting of any desired signal.

Figure 7:
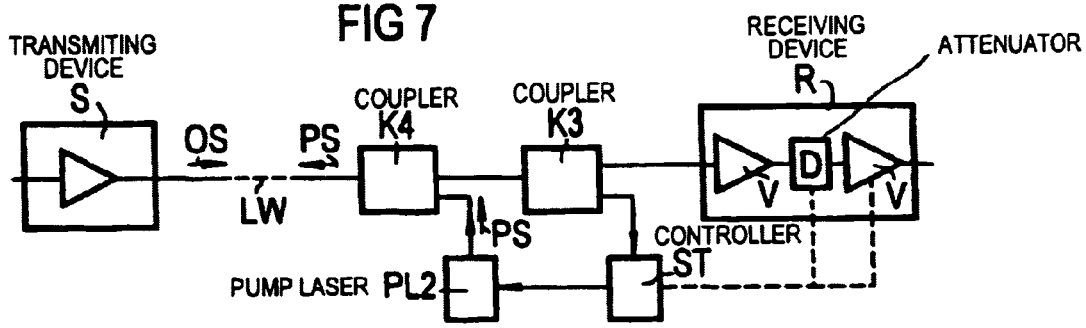
FIG. 7 shows a transmission section with a pump laser inserted at the receiving end.

In FIG. 7, a pump laser PL2 with an associated coupler K4, and a controller ST with an associated coupler K3 are arranged at the receiving end. The arrangement at the receiving end is to be preferred because of the more favorable signal-to-noise ratio. The controller ST can, moreover, intervene in amplifier stages V and an attenuator D of the receiving part R and optimize the overall gain/attenuation and the tilting.

Illustrated in FIG. 8 is a link section in which at the transmitting end (this can be any point between the transmitting device S and receiving device R) a first pump laser PL1 and at the receiving end a second pump laser PL2 feed in pump signals of the same wavelength $\lambda_{L1}$ via couplers K2 and K3, respectively. It is thereby possible to use weaker pump lasers. Owing to the laser at the transmitting end (i.e., PL1), there is also a quicker reaction to the absent signal/transmission band. Likewise, pump lasers with different wavelengths can be used in order to obtain a better compensation for the absent signal.

The illustration of details such as the controller and the measuring couplers has been dispensed with in this figure and in the further figures.

In FIG. 9, pump signals PS2, PS3 of different wavelengths $\lambda_{L2}$, $\lambda_{L3}$, respectively are fed in by corresponding two pump lasers PL2, PL3, arranged at the receiving end, via a coupler K5. The powers of the lasers can be lower this arrangement. Both the tilting and the change in level can be optimally corrected by a combination of a suitable red and a blue pump laser. In principle, it is also possible to achieve a better compensation by means of two red or two blue pump lasers with different pump frequencies.

Pump signals at the corresponding wavelengths can additionally be fed in at the transmitting end in a corresponding compensation unit KE. It is then also possible, for example, to fit the compensation unit KE at the transmitting end with an open-loop controller, and the pump lasers at the receiving end with a closed-loop controller.

Of course, it is also possible in principle to use more than two pump lasers. Likewise, the method can also be applied for more than two transmission bands.

FIG. 10 shows a transmission section for bidirectional operation. The signals for different transmission directions are separated by separating filters W. Two pump lasers PL2 and PL3 (or else two in each case) feed in pump signals PS2 and PS3 at both ends of the transmission section, in order to achieve optimum compensation for each received signal, even in the event of absence of a signal.

While the invention has been described in connection with what are presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method for adjusting tilting of a broadband optical signal transmitted via an optical transmission fiber through injecting pump signals into the optical transmission fiber, the method comprising:
   transmitting a plurality of transmission bands via the optical transmission fiber;
   measuring signal levels of each of the plurality of transmission bands;
   injecting at least one pump signal and at least one further pump signal into the optical transmission fiber to add or subtract energy to and from a signal using a Raman effect when at least two signal levels of the measured signal levels of at least one of the plurality of transmission bands are changed or absent from the transmitted broadband optical, the at least one pump signal having a wavelength less than a minimum wavelength of each of the plurality of transmission bands and the at least one further pump signal having a wavelength that is greater than a maximum wavelength of each of plurality of transmission bands; and
   selectively setting a power level for a chosen wavelength of at least one of the at least one pump signal and the at least one further pump signal such that the tilting of a transmission band, in which signal levels do not change, remains at least substantially constant at a receiving end of the optical transmission fiber.

2. The method according to claim 1, wherein the change of at least two measured signal levels comprises an absence of signal in a transmission band.

3. The method according to claim 2, wherein in the event of absence of a transmission band, a level of the at least one pump signal is adjusted at a high rate of adjustment based on known required changes in power and tilting and a signal level of the optical signal are readjusted.

4. The method according to claim 1, wherein wavelength and level of one or more of the pump signals are selected such that a prescribed tilting occurs at approximately a predetermined level.

5. The method according to claim 1, wherein the at least one pump signal is controlled to minimize tilting at the receiving end of the optical transmission fiber during undisturbed operation.

6. The method according to claim 1, wherein the at least one pump signal is controlled to minimize tilting in the transmission bands during undisturbed operation.

7. The method according to claim 1, wherein the at least one pump signal is controlled to keep the level of the optical signal constant.

8. The method according to claim 1, wherein the at least one pump signal is controlled to keep the transmission bands constant.

9. The method according to claim 1, wherein the at least one pump signal is injected at the receiving end of the optical transmission fiber.

10. The method according to claim 1, wherein the at least one pump signal is injected at a transmission end of the optical transmission fiber.

11. The method according to claim 1, wherein the at least pump signal is injected at the receiving end of the optical transmission fiber and at least one other of a plurality of pump signals is injected at a transmission end of the optical transmission fiber.

12. The method according to claim 1, wherein the at least one pump signal is injected at both the receiving end of the optical transmission fiber and a transmission end of the optical transmission fiber when the pump signals are bidirectional transmission pump signals.

13. A method for adjusting tilting of an optical signal transmitted via an optical conductor through injecting a plurality of pump signals into the optical conductor, the method comprising:
  transmitting a plurality of transmission bands via the optical conductor;
  measuring signal levels of each of the plurality of transmission bands;
  injecting at least one pump signal into the optical conductor when an absence of a signal level from the transmitted broadband optical signal of the measured signal levels in a transmission band of the plurality of transmission bands occurs; and
  setting a level of at least one pump signal such that the tilting of a transmission band in which the absence of the signal level does not occur remains at least substantially constant at a receiving end of the optical conductor causing said tilting;
  wherein a pump wavelength of a pump laser used to compensate an absent transmission band corresponds to a mean wavelength of the absent transmission band.

14. An apparatus for adjusting tilting and level of an optical signal transmission via an optical transmission fiber comprising:
  at least first and second pump lasers that respectively inject at least first and second pump signals into the optical transmission fiber to add or subtract energy to and from a signal using a Raman effect, the first pump signal having a wavelength less than a minimum wavelength of the optical signal transmission and the second pump signal having a wavelength that is greater than a maximum wavelength of the optical signal transmission; and
  a controller for measuring at least two signal levels of one of at least two transmission bands, and selectively adjusting a power level for a chosen wavelength of the first and second pump signals when said at least two measured signal levels of at least one of the plurality of transmission bands are changed in the transmitted broadband optical signal causing said tilting, wherein the tilting of a transmission band in which signal levels do not change remains at least substantially constant at a receiving portion of the optical transmission fiber.

15. The apparatus according to claim 14, wherein change of at least two measured signal levels comprises an absence of a signal in a transmission band.

16. The apparatus according to claim 14, wherein the wavelengths and power levels of the respective pump signals of the first and second pump lasers are selected such that the undisturbed transmission band in which signal levels do not change has approximately a predetermined tilting and a predetermined level.

17. The apparatus according to claim 14, wherein the controller adjusts the power level of the first and second pump lasers at a high rate of adjustment based on known required changes in power when an absence of signal in a transmission band occurs.

18. The apparatus according to claim 17, wherein controller readjusts at least one of the tilting and the level of the transmission band in which signal levels do not change after the power level of the first and second pump lasers has been adjusted at the high rate of adjustment.

19. The apparatus according to claim 14, further comprising:
  a transmitting portion connected to the optical transmission fiber; and
  an optical amplifier located in at least one of the transmitting portion and the receiving portion;
  wherein the controller adjusts at least one of a gain and a tilting of the optical amplifier.

20. An apparatus for adjusting tilting and level of an optical signal transmission via an optical conductor comprising:
  at least one pump laser that injects pump signals into the optical conductor; and
  a controller for measuring at least two signal levels of one of at least two transmission bands, and adjusting a power level of at least one of the respective pump signals when said at least two measured signal levels of at least one of the plurality of transmission bands are changed in the transmitted broadband optical signal causing said tilting, wherein the tilting of a transmission band in which the absence of the signal level does not occur remains at least substantially constant at a receiving end of the optical conductor;
  wherein a pump wavelength of the at least one pump laser used to compensate an absent transmission band corresponds to a mean wavelength of the absent transmission band.

21. The apparatus according to claim 20, wherein change of at least two measured signal levels comprises the absence of the signal level.

22. The apparatus according to claim 20, wherein the wavelengths and power levels of the respective pump signals of at least two pump lasers are selected such that the transmission band in which signal levels do not change has approximately a predetermined tilting and a predetermined level.

23. The apparatus according to claim 20, wherein the controller adjusts the power level of at least two pump lasers at a high rate of adjustment based on known required changes in power when an absence of signal in a transmission band occurs.

24. The apparatus according to claim 23, wherein controller readjusts at least one of the tilting and the level of the transmission band in which signal levels do not change after the power level of the at least two pump lasers has been adjusted at the high rate of adjustment.

25. The apparatus according to claim 20, further comprising:
  a transmitting portion connected to the optical conductor; and
  an optical amplifier located in at least one of the transmitting portion and the receiving portion;
  wherein the controller adjusts at least one of a gain and a tilting of the optical amplifier.

* * * * *